Patented Apr. 2, 1940

2,195,587

UNITED STATES PATENT OFFICE 2,195,587

TREATED PENETRABLE ARTICLE AND METHOD OF MAKING

Foster Dee Snell, New York, N. Y.

No Drawing. Application November 5, 1938, Serial No. 238,974

10 Claims. (Cl. 18—47.5)

This invention relates to an article of manufacture comprising a substantially insoluble product of the reaction of an alkali metal silicate and fluosilicate in the presence of a penetrable base material containing lime or magnesia. The invention relates also to the method of making the article. In the preferred embodiment, the invention comprises reacting an aqueous mixture of dissolved sodium silicate and sodium fluosilicate in contact with a base material containing Portland cement, chrysotile asbestos, or a mixture of the cement and asbestos.

It is an object of the invention to provide a thin but firmly adhering coating of desired color upon an asbestos and cement sheet.

Another object is to provide a bonded asbestos product in which the binder consists largely of a reaction product of sodium silicate and sodium fluosilicate in the presence of the asbestos, a portion of the binder extending over the exterior surface of the asbestos fibres and being continuous with another portion of the binder within or chemically bonded to the fibres.

Other objects and advantages will appear from the detailed description that follows.

In making asbestos and Portland cement sheets, such as shingles or siding units, for example, there has been great difficulty in providing a proper coloring of the face of the sheet, at a satisfactory cost and with certain and permanent adherence of the coloring material to the face under the conditions of use. The invention will be described more particularly, therefore, in connection with the solution of this problem.

In making such coated shingles or siding units, I use machines and methods that are conventional except for the modifications noted herein. Thus, there is first made an intimate mixture of chrysotile asbestos fibres of shingle grade and Portland cement, in proportions commonly used in making such units. The mixture is formed and lightly pressed into a wet sheet as by an over-riding roller, the sheet is cut into segments of size somewhat larger than desired for the finished units, and the segments are strongly compressed in an hydraulic press, to densify the segments and express excess water therefrom. The segments may be provided with surface graining such as is common on the commercial asbestos and cement siding units now in extensive use, this graining being produced by pressing the segments, in the hydraulic pressing operation, against a plate having surface configurations adapted to impart to the asbestos and cement sheets the desired graining. Finally, the compressed segment is hardened by hydration of the Portland cement therein. It is then cut to size and punched for nail holes, as desired.

In making these units by the usual method described, various conventional admixtures may be present in the composition and the hardening of the cement in the compressed sheet may be effected under any of the commercially used conditions of curing. Thus, the hardening is effected under conditions preventing evaporation of water necessary for the hydration of the Portland cement.

In my process, I apply to the face of the asbestos and cement sheet that is to be exposed during use a mixture containing a preformed aqueous solution of dissolved (or dispersed) sodium silicate and solid sodium fluosilicate. Ordinarily the fluosilicate is dissolved in part, the remainder of the fluosilicate being suspended in the aqueous mixture as used. For best results, the proportion of the fluosilicate used should be equal to or slightly in excess of the amount required to neutralize the alkalinity of the sodium silicate, say one mol of the latter or slightly more for two molecular proportions of sodium oxide in the latter, the excess of fluosilicate providing acidic material for reaction with available alkali of the face portion of the article being coated, principally calcium or magnesium oxide or hydroxide.

A portion of the fluosilicate, however, may be substituted by a relatively, inexpensive acid, as for example, a mineral acid such as hydrochloric, sulfuric, or nitric. In such a case, the fluosilicate is used in amount at least adequate to cause setting of the coating to non-flowable condition. To the coating there is then applied an aqueous solution of the said acid in amount approximately equivalent to the portion of the fluosilicate omitted. For this purpose, 4 mols of hydrochloric acid, for instance, are calculated as equivalent to 1 mol of the fluosilicate, the amounts of the acid and fluosilicate used being jointly at least equivalent to the sodium silicate. Ordinarily, the mineral acid is applied in about 5 to 15% solution after the coating has set in part or completely.

The concentration of sodium silicate in the aqueous solution may vary widely. I have used to advantage a commercial solution known as "N" brand sodium silicate containing about 38 parts dry weight of the silicate to 100 parts of water. The concentration of the silicate should be below that which, if used, would make a gelatinous mixture of very slow or negligible rate of penetration of the asbestos and cement base sheet.

The aqueous mixture of the silicate and fluosilicate is allowed to penetrate into the asbestos fibres or into other pores or voids in the sheet, after which the silicate and fluosilicate mixture sets by the chemical reaction or reactions which occur.

The silicate and fluosilicate mixture may be added as a coating to the asbestos and cement sheet before the strong compression thereof which has been referred to. Thus, the mixture may be sprayed gently upon the top of a wet, readily penetrable, substantially uncompressed asbestos and cement sheet that has been shaped at least roughly, as by passage under a leveling device or light roller. The coated sheet is subjected to the strong compression promptly, say within a quarter hour or so, after the coating is applied. There is thus produced thorough impregnation of the face portion of the sheet by the aqueous coating mixture. The article so made is hardened, the Portland cement undergoing setting at the same time that the silicate and fluosilicate are reacting to give an insoluble product with attendant setting of the coating mixture, as will be discussed later in greater detail.

Or, the aqueous mixture of silicate and fluosilicate may be applied to the sheet after it has been strongly compressed. For instance, asbestos and cement sheets that have been strongly compressed and cured may be sprayed over the face with the aqueous mixture of sodium silicate and fluosilicate or may be dipped therein.

In any case, the coating mixture is maintained in wet condition until after the occurrence of the reaction which produces the insoluble product and setting of the mixture. Thus, the coated sheet should be maintained in moist condition for a period of a couple of hours or so, preferably about four hours or longer.

For best results the ratio of sodium oxide to silicon dioxide in the sodium silicate used should be relatively high, say at least one molecular proportion of sodium oxide to 3.25 molecular proportions of silicon dioxide and suitably about one mol of the former to two mols of the latter. With such a proportion I have found that there is a retarded rate of setting of the silicate and fluosilicate composition, so that there is time for penetration of the solution within the face portion of the asbestos and cement sheet, that is within the pores of the sheet or within the asbestos fibers themselves, and for any side reactions that occur and may bond the coating firmly to the base, before the mixture becomes so thick as not to penetrate readily into available spaces.

When the reaction has occurred, the product may be dried, if necessary to remove any water that may be present in objectionable amount. Thus drying may be effected at atmospheric temperatures, more rapidly at temperatures slightly above the boiling point of water, or at intermediate temperatures.

In order to provide the desired color there is supplied to the coating composition pigments of desired kind. These pigments are preferably incorporated into the aqueous mixture of silicate and fluosilicate at the time these materials are first made into the aqueous mixture. Thus, titanium dioxide and powdered sodium fluosilicate may be mixed at the same time with the sodium silicate solution and the resulting mixture applied promptly to the face of the asbestos and cement sheet, as described. Other pigments may be used in place of or in addition to the titanium dioxide, the particular pigment or pigments chosen depending upon the color and other properties desired in the coating film. The pigments used should be ones that do not interfere with the setting of the silicate and fluosilicate mixture and that are not deleteriously affected by alkalinity or any other ingredient present in the coating composition, either as applied or after setting.

The coating composition may be applied in such proportion of film-forming materials to base, as to give coatings of various thicknesses. Suitable coloring of the face of a sheet with a pigmented coating composition may be obtained with 2 to 10 pounds or more dry weight of silicate and fluosilicate to 100 square feet of the asbestos and cement base sheet.

With the method described there may be provided very thin, adequately colored coating films. Various theories may be advanced to explain the result obtained. However, the invention is not limited to any theory of explanation.

In the first place, the application of the coating in flowable form, with a delayed setting period, permits penetration of portions of the coating into voids within the fibers or within the cement before the setting occurs.

Also, the Portland cement, during hydration accompanying curing, and the chrysotile asbestos reinforcement therefor are considered as sources of lime and magnesia respectively, either free or in condition to give calcium or magnesium precipitates when the silicate and fluosilicate composition react in the presence of the cement and asbestos. Thus, lime associated with the exterior portion of a cement particle may form a calcium silicate, fluosilicate, or fluoride, as, for instance, according to one or more of the following equations:

$$4NaHSiO_3 + Na_2SiF_6 + 3H_2O = 5H_2SiO_3 + 6NaF$$

$$H_2SiO_3 \text{ or } Na_2SiO_3 + Ca(OH)_2 = \\ CaSiO_3 + 2H_2O \text{ or } 2NaOH + H_2O$$

$$H_2SiF_6 \text{ or } Na_2SiF_6 + Ca(OH)_2 = \\ CaSiF_6 + 2H_2O \text{ or } 2NaOH + H_2O$$

$$6NaF + 3Ca(OH)_2 = 3CaF_2 + 6NaOH$$

Some of the reactions that occur are actually probably somewhat more complex than those represented. Also, side reactions may be important. However, the equations illustrate generally the type of compounds that may be produced, when the typical composition of sodium silicate is used.

The magnesia or appreciably (but very slightly) dissolved magnesium-containing portion of the exposed crystals at the surface of the chrysotile asbestos may form insoluble products by reactions similar to those represented by the second and last equations above. In the reaction product, a given unit of magnesium on the one hand may be an integral part of a crystal of asbestos and, on the other, may be chemically combined with an ingredient of the coating composition.

The result obtained, regardless of the theory of explanation, is firm anchorage of the coating composition to the base and continuity of the film or coating layer with masses thereof within pores or spaces in the base, that is, within the cement or within the asbestos fibres.

The first one of the equations represents theoretically the chief reaction of setting of the coating composition, the formation of the originally gelatinous silicic acid causing first a thickening and then hardening of the composition. The silicic acid after being dried as described is substantially insoluble (in water).

To obtain the preferred type of product and reaction, chrysotile asbestos should be present in the base being coated and in part exposed on the face thereof. For some purposes, however, the coating mixture described may be applied to a Portland cement composition, in cast form, containing no asbestos.

Also, the aqueous silicate and fluosilicate mixture may be applied as a coating or impregnating material to asbestos articles such as asbestos paper or pipe covering, and then hardened and dried as described, drying being delayed until the coating has hardened.

In using the said mixture as a binder, it may be mixed with asbestos fibres and the resulting material shaped and hardened. In making asbestos paper or millboard, for instance, the aqueous silicate and fluosilicate mixture is mixed with chrysotile asbestos fibres and paper or millboard then promptly formed in usual manner, the product being kept moist for several hours, that is, until the binder has hardened.

In a modification of the invention, the silicate and fluosilicate mixture is used to bond together sheets of asbestos felt or paper. Thus asbestos paper may be wound spirally on itself, to form a tube, with the silicate and fluosilicate composition applied by dipping, spraying, or in other suitable manner as a coating over the inside and/or outside of the tube. The several layers may be only adhered together by the said composition; or, the asbestos paper of the several layers may contain the same composition, as the inner binder for the asbestos fibers. Alternating plies of the paper may be corrugated or otherwise irregularly surfaced.

In place of the sodium silicate and fluosilicate, there may be used for some purposes the corresponding potassium or ammonium salts, these being referred to herein as "alkali metal" silicates and fluosilicates, the term as used excluding the relatively expensive derivatives of the less common metals of the alkali metal group of the periodic table of the elements.

It will be understood that the details given are for the purpose of illustration, not restriction, and that variations within the spirit of the invention should be included in the scope of the appended claims.

What I claim is:

1. In making an article of manufacture, the method which comprises forming a shaped water-penetrable base including Portland cement, applying over a face thereof a mixture of a preformed aqueous solution of an alkali metal silicate and solid alkali metal fluosilicate, and maintaining the said mixture in wet condition until after the setting thereof.

2. In making an article of manufacture, the method which comprises forming a shaped water-penetrable wet base including Portland cement in uncured condition, applying over a face thereof an aqueous mixture of a dissolved alkali metal silicate and solid alkali metal fluosilicate, and hardening the Portland cement while reaction is occurring between the said silicate and fluosilicate.

3. In making an article of manufacture, the method which comprises forming a sheet containing an intimate mixture of chrysotile asbestos fibres and Portland cement and applying over a face of the sheet an aqueous mixture of dissolved sodium silicate and sodium fluosilicate adapted to penetrate the said fibres and wet the cement and then to set by chemical reaction, the sodium silicate including at least 1 molecular proportion of sodium oxide for 2 to 3.25 molecular proportions of silicon dioxide.

4. In making an article of manufacture, the method which comprises forming a wet substantially uncompressed sheet containing chrysotile asbestos fibres and Portland cement, applying to a face of the sheet an aqueous mixture of dissolved sodium silicate and sodium fluosilicate, promptly compressing strongly the resulting product, and then hardening the cement therein, the sodium silicate including at least 1 molecular proportion of sodium oxide for 2 to 3.25 molecular proportions of silicon dioxide.

5. The method described in claim 1, the fluosilicate being present in proportion at least approximately equivalent to the said silicate.

6. An article of manufacture comprising a shaped base including Portland cement in hardened condition and a coating on a face thereof, the coating including products of the interaction of water-soluble alkali metal silicate and alkali metal fluosilicate in the presence of lime of the Portland cement.

7. In making an article of manufacture, the method which comprises forming a shaped water-penetrable base including Portland cement, applying over a face thereof a coating of an aqueous mixture of a dissolved alkali metal silicate and an alkali metal fluosilicate, applying to the said coating an aqueous mineral acid, and maintaining the resulting product in wet condition until after the setting of the coating.

8. In making an article of manufacture, the method which comprises forming a shaped water-penetrable base including asbestos, applying over a face thereof a coating of an aqueous mixture of sodium fluosilicate and sodium silicate, the silicate being substantially in excess of the proportion equivalent to the fluosilicate, and applying over the coating an aqueous solution of a mineral acid in amount at least equivalent to the excess of the silicate over the fluosilicate.

9. In making an article of manufacture, the method which comprises forming a shaped water-penetrable sheet including an intimate mixture of chrysotile asbestos and Portland cement, applying over a face thereof a coating of an aqueous mixture of sodium fluosilicate and sodium silicate, the silicate being substantially in excess of the proportion equivalent to the fluosilicate, allowing the coating to harden to a nonflowable condition, and then applying thereover an aqueous solution of a mineral acid in amount at least equivalent to the excess of the silicate over the fluosilicate.

10. The method described in claim 1, the fluosilicate being present in proportion at least approximately equivalent to the said silicate and to the available alkali of the face portion of the base.

FOSTER DEE SNELL.